United States Patent [19]
Chern

[11] Patent Number: 6,120,105
[45] Date of Patent: Sep. 19, 2000

[54] WHEEL RIM FOR BICYCLES

[76] Inventor: Lai Jiann Chern, No. 1-1, Chang Yuan Road, Hua Tan Hsiang, Changhua Hsien, Taiwan

[21] Appl. No.: 09/225,406

[22] Filed: Jan. 5, 1999

[51] Int. Cl.⁷ .................................................... B60B 21/00
[52] U.S. Cl. ................................................................ 301/95
[58] Field of Search ................................. 301/58, 95–96, 301/97, 98; 188/24.11, 24.12, 344

[56] References Cited

U.S. PATENT DOCUMENTS

| | | | |
|---|---|---|---|
| 3,237,732 | 3/1966 | Hayes | 188/72.5 |
| 3,305,048 | 2/1967 | Brilando | 188/24.12 |
| 3,433,327 | 3/1969 | Regis | 188/24.11 |
| 3,732,951 | 5/1973 | Hata et al. | 301/97 |
| 4,531,754 | 7/1985 | Engleman | 188/24.11 |
| 5,246,275 | 9/1993 | Arredondo, Jr. | 301/95 |

FOREIGN PATENT DOCUMENTS 633130  1/1928  France ..................................... 301/96

*Primary Examiner*—S. Joseph Morano
*Assistant Examiner*—Long B. Nguyen
*Attorney, Agent, or Firm*—Charles E. Baxley, Esq.

[57] ABSTRACT

A wheel rim for a bicycle includes an annular slot formed between two peripheral sides each having a number of grooves formed in the outer surface and formed between a number of concentric ribs which are used for engaging with a brake pad. The outer surfaces of the wheel rim each includes a wavy shape. The ribs are preferably tooth-shaped. The wheel rim includes two or more concentric bulges formed between the ribs and having a height greater than that of the concentric ribs for engaging with the brake pad and for facilitating the braking operation of the bicycle.

1 Claim, 4 Drawing Sheets

WHEEL RIM FOR BICYCLES

BACKGROUND OF THE INVENTION

1. Field of the Invention

The present invention relates to a wheel rim, and more particularly to a wheel rim for bicycles.

2. Description of the Prior Art

Typical wheel rims for bicycles comprise two sides of smooth outer surfaces for engaging with the brake pads. When riding in the raining days, the smooth outer surfaces may become slip such that the brake pads may not be used for effectively engaging with the wheel rim and for braking the bicycles.

The present invention has arisen to mitigate and/or obviate the afore-described disadvantages of the conventional wheel rims for bicycles.

SUMMARY OF THE INVENTION

The primary objective of the present invention is to provide a wheel rim for a bicycle in which the wheel rim includes a brake facilitating mechanism for engaging with the brake pad and for facilitating the braking operation of the bicycle.

In accordance with one aspect of the invention, there is provided a wheel rim for a bicycle comprising a rim body including an annular slot defined between two peripheral sides, the peripheral sides of the rim body each including an outer surface having a plurality of grooves defined between a plurality of concentric ribs, the ribs of the outer surfaces being provided for engaging with a brake pad of a bicycle brake device.

The outer surfaces of the rim body each includes a wavy shape. The ribs are preferably tooth-shaped. The rim body includes at least two concentric bulges formed on the outer surfaces thereof and formed between the ribs and having a height greater than that of the concentric ribs for engaging with the brake pad and for facilitating the braking operation of the bicycle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
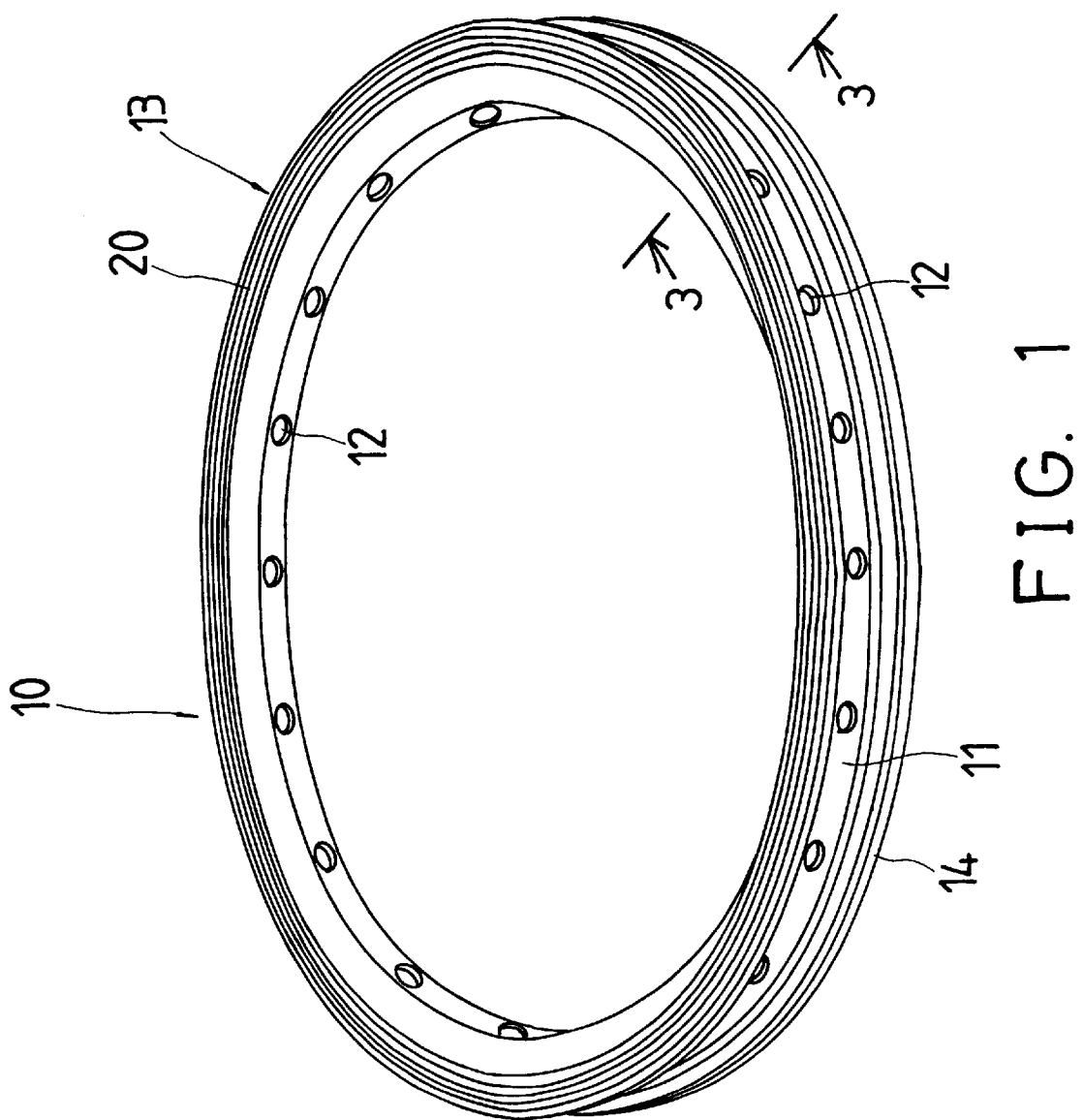
FIG. 1 is a perspective view of a wheel rim for a bicycle in accordance with the present invention.

Referring to the drawings, and initially to FIGS. 1–4, a wheel rim in accordance with the present invention comprises a rim body 10 having an annular slot 11 defined between two peripheral sides 13, 14 and having a number of holes 12 formed therein for engaging with the spokes of the bicycle wheel. The sides 13, 14 of the rim body 10 each includes a coarse or wavy outer surface 20 having a number of concentric grooves 21 defined between a number of concentric ribs 22. The ribs 22 of the outer surfaces 20 are provided for engaging with the brake pad 30 of the bicycle brake device. The grooves 21 are provided for receiving the dirts and the water from the pad 30 and for allowing the dirts and the water to be disengaged from the pad 30.

Figure 2:
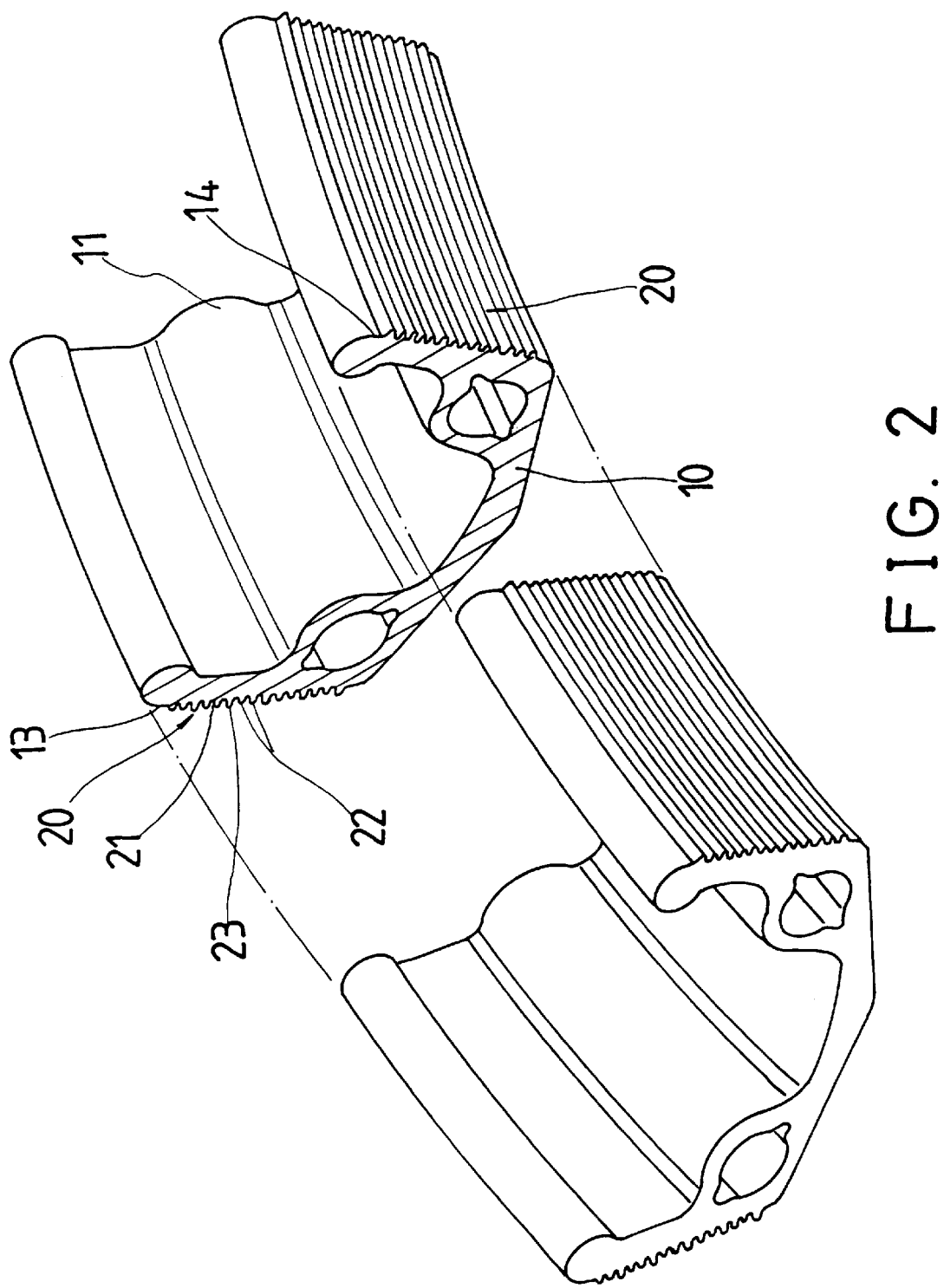
FIG. 2 is a perspective view showing two sections of the wheel rim.
Figure 3:
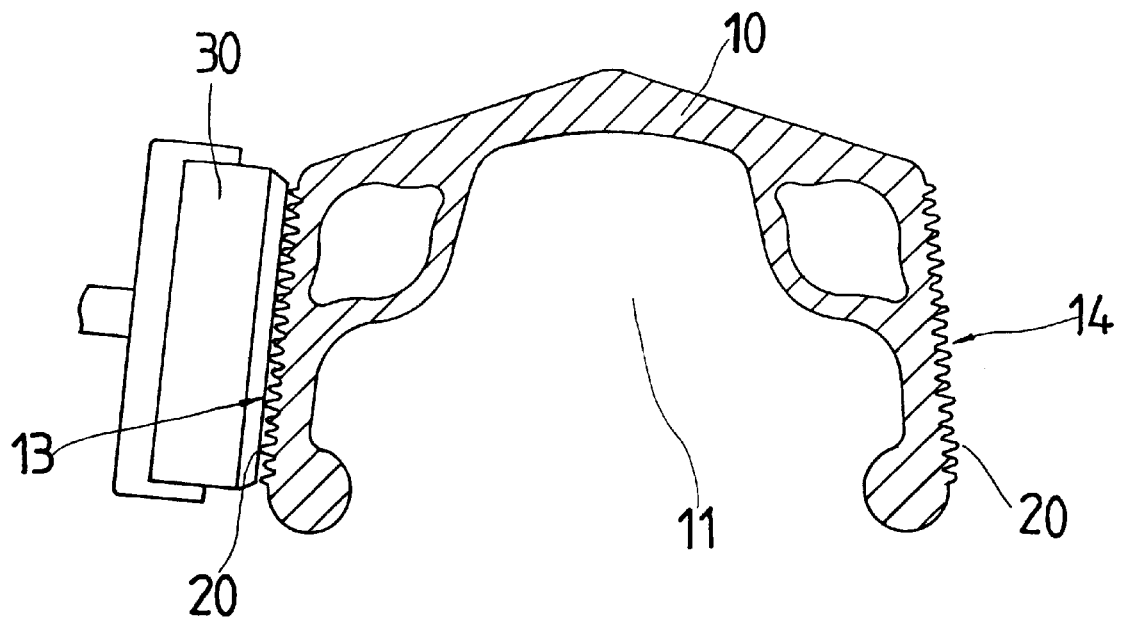
FIG. 3 is a cross sectional view taken along lines 3—3 of FIG. 1, illustrating the operation of the wheel rim.
Figure 4:
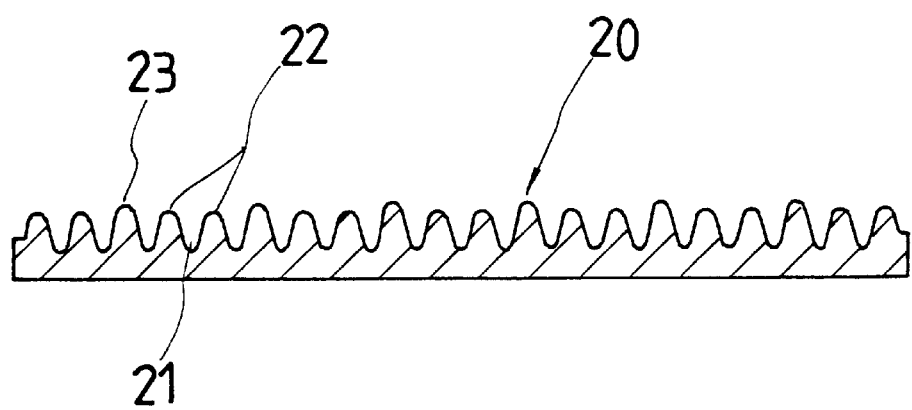
FIG. 4 is an enlarged partial cross sectional view of the wheel rim.

The outer surfaces 20 of the rim body 10 each preferably includes two or more concentric ribs or bulges 23 having a height greater than that of the ribs 22 (FIGS. 2–4). Or, several of the ribs 23 have a height greater than that of the other ribs 22 and are arranged alternatively with the ribs 22. For example, as shown in FIGS. 2–4, two ribs 22 of less height are provided between two ribs or bulges 23 of greater height. The bulges 23 are provided for engaging with the pad 30 and for facilitating the disengagement of the dirts and the water from the pad 30 and for facilitating the braking operation of the bicycle.

Figure 5:
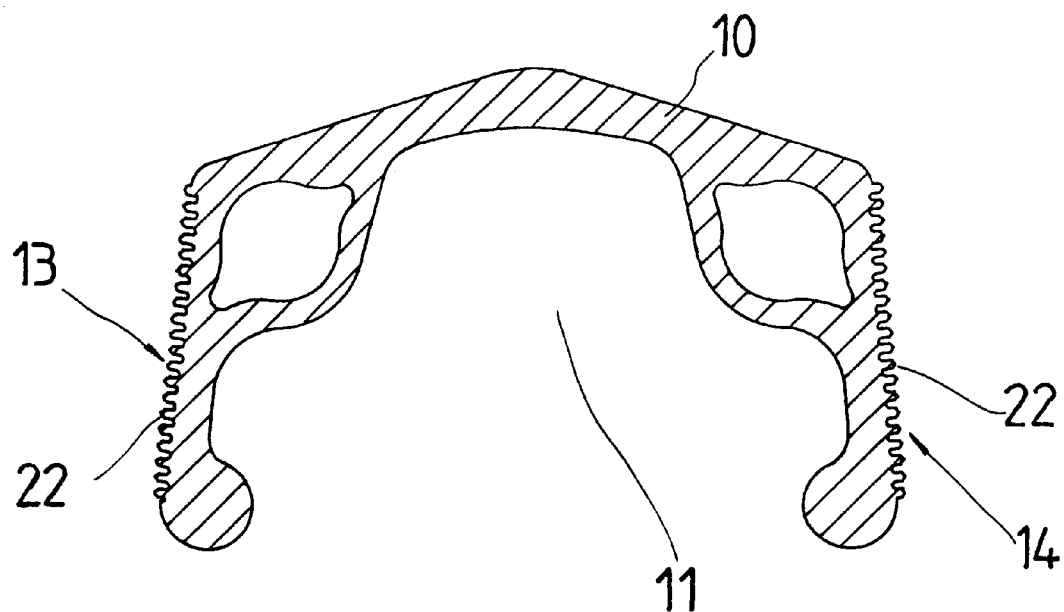
FIG. 5 is a cross sectional view similar to FIG. 3, illustrating the other application of the wheel rim.
Figure 6:
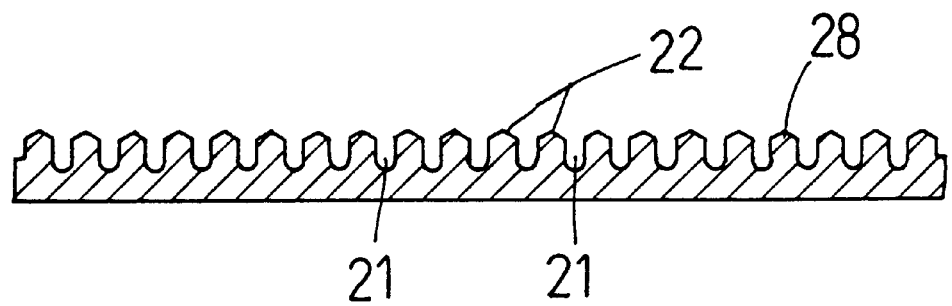
FIG. 6 is an enlarged partial cross sectional view of the wheel rim as shown in FIG. 5.

Referring next to FIGS. 5 and 6, the ribs 22 and/or the bulges 23 preferably include a tooth-shape or include a cusp 28 formed on the free end portion for further facilitating the braking operation with the brake pad 30.

The wheel rim or the rim body 10 may be formed by extruding operations with aluminum materials, such that the ribs 22 and/or the bulges 23 may be easily formed during the formation of the wheel rim, without any further additional machining operations.

Accordingly, the wheel rim in accordance with the present invention includes a mechanism for engaging with the brake pad and for facilitating the braking operation of the bicycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheel rim for a bicycle comprising:
a rim body including an annular slot defined between two peripheral sides, said peripheral sides of said rim body each including an outer surface having a plurality of grooves defined between a plurality of concentric ribs, said ribs of said outer surfaces being provided for engaging with a brake pad of a bicycle brake device, said rim body further including at least two concentric bulges formed on said outer surfaces thereof and formed between said ribs and having a height greater than that of said concentric ribs for engaging with the brake pad.

* * * * *